(No Model.)

J. HILL.
BEEHIVE.

No. 557,808. Patented Apr. 7, 1896.

Witnesses
Jno. Imrie
Simon Messer

Inventor
Josephus Hill
by Edgar T. Gaddis
Attorney

UNITED STATES PATENT OFFICE.

JOSEPHUS HILL, OF CARBONDALE, ILLINOIS.

BEEHIVE.

SPECIFICATION forming part of Letters Patent No. 557,808, dated April 7, 1896.

Application filed December 12, 1895. Serial No. 571,923. (No model.)

*To all whom it may concern:*

Be it known that I, JOSEPHUS HILL, a citizen of the United States, residing at Carbondale, in the county of Jackson and State of Illinois, have invented certain new and useful Improvements in Beehives, of which the following is a specification.

My invention relates to improvements in hives for swarming bees; and it consists in certain novel features hereinafter described and claimed.

Figure 1:
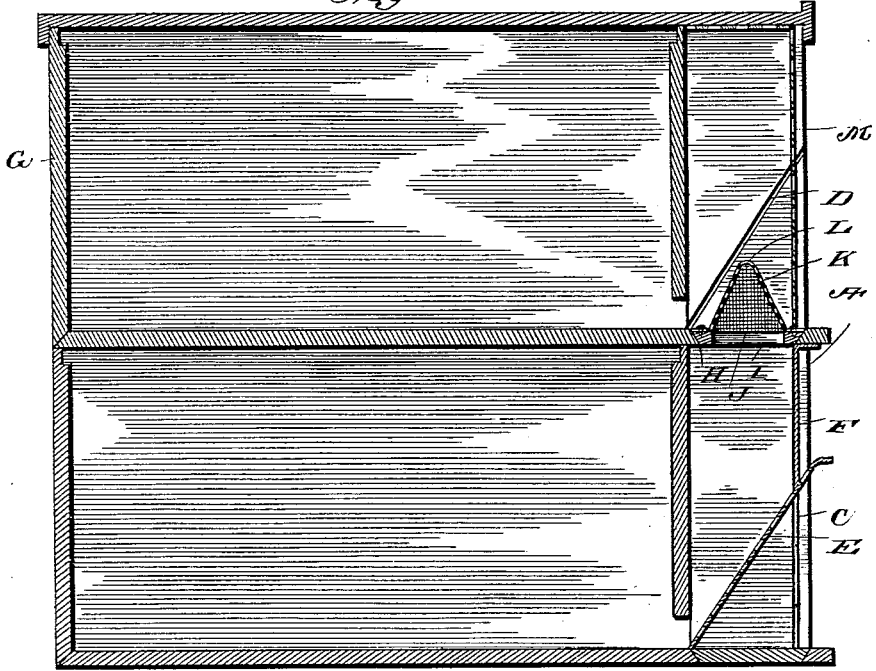
Figure 2:
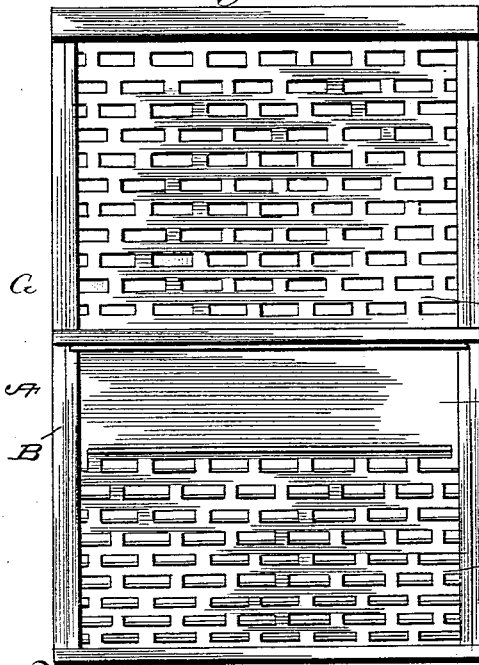
Figure 3:
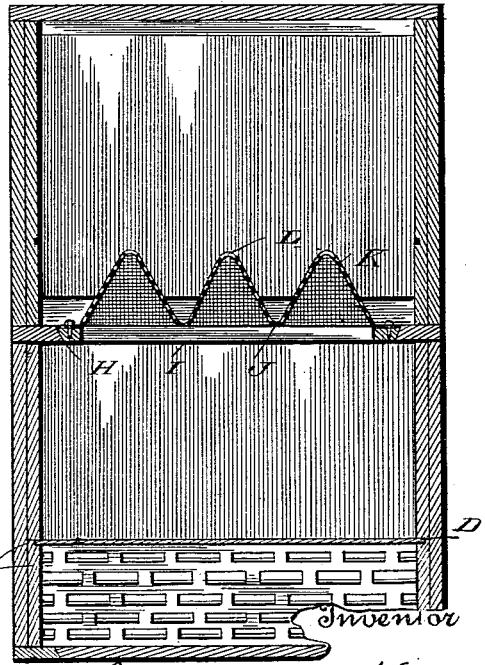

In the annexed drawings, which fully illustrate my invention, Figure 1 is a longitudinal vertical section of a beehive embodying my improvements. Fig. 2 is an end elevation of the same, and Fig. 3 is a transverse vertical section.

Referring to the drawings more particularly by letter, A designates a hive constructed of any suitable material and having its side walls extended somewhat beyond its front end, as shown at B. These extended portions of the side walls are provided on their inner faces with the vertical grooves C and the inclined or oblique grooves D below the vertical grooves. Just before the bees are ready to swarm a perforated metallic plate is slipped down in the inclined grooves D to rest on the bottom of the hive. The lower end of this plate E extends across the opening in the end of the hive, and the perforations are of such a size as to permit the passage of the working bees, but prevent the passage and escape of the queen. Above the perforated plate a solid metallic plate F is fitted in the grooves C, said plate resting on the perforated plate E and serving to cut off the light.

Above the hive A and resting on the same is a second hive G of the same dimensions as the lower hive and having an opening H in its bottom directly over the chamber formed by the plates E F and the front end wall of the said lower hive. Fitted in said opening H is a frame I, on which I secure a fine netting or screen J, having the cones K formed therein, said cones having openings L at their apexes. Secured to the front ends of the side walls of this upper hive is a perforated metallic plate M, for the purpose of lighting and ventilating the said hive, the perforations being of such a size as to permit the free passage of the working bees, but prevent the passage of the queen.

The construction of the device being thus made known, the manner of using it will, it is thought, be readily understood. The bees are normally in the lower hive. When they are ready to swarm, the plates E and F are slipped into position, as described, and the upper hive placed on the lower one. Now, when the swarm moves, the working bees will be permitted to pass out through the perforated plate, but the passage of the queen will be prevented. The queen will not remain in the hive after the swarm leaves, and in trying to escape will pass upward through the cones K into the upper hive and will be thereby trapped. The swarm will soon discover the absence of the queen and will return and finding her in the upper or new hive will remain there, and the desired result is accomplished.

My hive is very simple in construction and obviously efficient in operation.

Having thus described my invention, what I claim, and desire to secure by Letters Patent, is—

1. The combination of the upper and lower hives, a series of cones forming a communication between the front ends of the same, an imperforate plate removably fitted in the front end of the lower hive and terminating above the bottom of the same, and an inclined perforated plate removably fitted in the front end of the hive below the imperforate plate and extending to the bottom of the hive.

2. The combination of the lower hive provided in its front end with an inclined perforated plate and with an imperforate vertical plate extending from said perforated plate to the top of the hive, the upper hive resting on the lower hive, a perforated plate removably fitted in the front end of the upper hive and closing the same, and a series of cones having open apexes forming a communication between the front ends of the two hives.

In testimony whereof I affix my signature in the presence of two witnesses.

JOSEPHUS HILL.

Witnesses:
E. J. INGERSOLL,
J. W. WINFREY.